Figure 1:
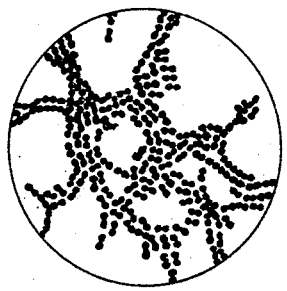

(No Model.)

V. STORCH.
METHOD OF MAKING BUTTER.

No. 495,381. Patented Apr. 11, 1893.

Witnesses:
Chas. F. Burkhardt
Theo. L. Popp

Vilhelm Storch Inventor
By Wilhelm & Bonner
Attorneys.

UNITED STATES PATENT OFFICE.

VILHELM STORCH, OF COPENHAGEN, DENMARK, ASSIGNOR TO CHRISTIAN D. A. HANSEN, OF SAME PLACE.

METHOD OF MAKING BUTTER.

SPECIFICATION forming part of Letters Patent No. 495,381, dated April 11, 1893.

Application filed August 17, 1892. Serial No. 443,290. (No specimens.)

*To all whom it may concern:*

Be it known that I, VILHELM STORCH, a subject of the King of Denmark, residing at Copenhagen, Denmark, have invented new and useful Improvements in Methods of Making Butter, of which the following is a specification.

This invention relates to the manufacture of butter from sour or ripened cream or milk. In the usual method of butter making the sweet cream is left to ripen for about twenty-four hours before being churned. This ripening or souring depends upon the development of bacteria, the germs of which enter the milk and cream in all stages of their treatment from the time the cow is milked until the cream is churned. The peculiar and varying flavor of sour cream butter is due to a large extent to the action of these bacteria and in far less degree to the food consumed by the milch cows. Different kinds of bacteria produce different flavors and characteristics in the butter, some producing a fine aromatic flavor, and other bad flavors, such as bitter, oily or tallowy flavors. In different sections of the country different species of bacteria predominate and produce different results and in the same dairy the predominating kind of bacteria may differ at different times and so effect the results. The ripening is therefore subject to numerous accidental and varying conditions and it has heretofore not been in the power of dairymen to regulate the process so as to always produce butter of a pure, aromatic flavor. My method of treatment has the object to secure control of the process of ripening and to produce in all cases butter of fine, aromatic flavor.

In practicing my method of butter making I proceed as follows:—The cream or milk is first practically freed of all bacteria which it contains by heating it to a temperature of from 70° to 80° centigrade and it is then cooled immediately to about 25° centigrade for the purpose of placing it in condition for a new growth of bacteria. This process of sterilizing the cream or milk may be repeated when the cream or milk is of particularly bad flavor. I then add to this cream a starter which contains only flavor producing bacteria or in which the flavor producing bacteria predominate and in which the harmful bacteria, such as those of putrefaction and others producing bad effects are found in such insignificant numbers as to be practically harmless. I prefer to prepare such a starter by means of a pure culture of flavor-producing bacteria. The materials from which these flavor producing acid bacteria are obtained are fresh butter of excellent quality and of pure, rich flavor; fully ripened cream of the same quality and flavor, and fresh butter-milk from the churning of such cream. The isolation of said bacteria from the multitude of other micro-organisms existing in these materials is often very difficult, and requires considerable experience. For this isolation I use the process usually employed by bacteriologists, which consists in spreading the bacteria-germs from said materials in beef-peptone-gelatine of neutral reaction with or without an addition of agar-agar. The pure cultivation of the separated flavor-producing acid bacteria can be effected either in absolutely sterilized cream, milk or whey, with or without an addition of carbonate of lime or of carbonates of the alkalies, or in solutions of milk sugar, glucose or sugar with the addition of various nitrogenous and other nutritive matters necessary to the development of the said bacteria, such as peptones, salts of ammonia, biphosphate of potassium, chloride of calcium, sulphate of magnesium, &c., or in neutral solutions free of sugar, as decoctions of fresh beef, vegetables, &c.

Figure 5:
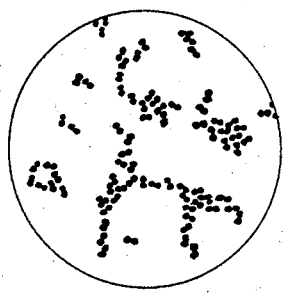
Figure 2:
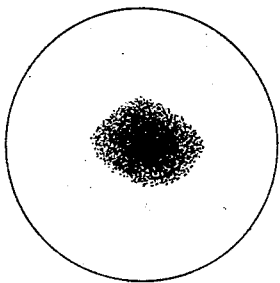
Figure 6:
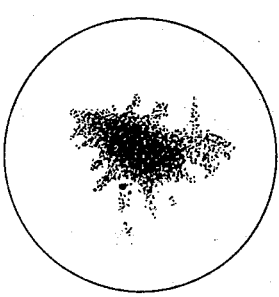
Figure 3:
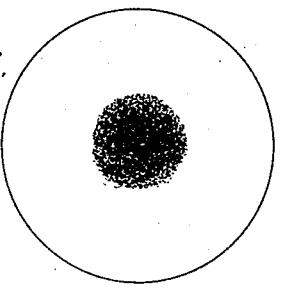
Figure 7:
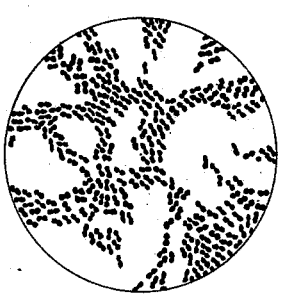
Figure 4:
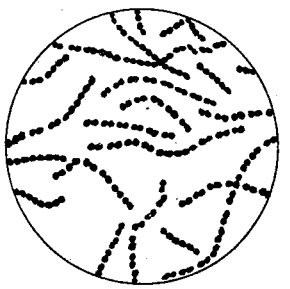
Figure 8:
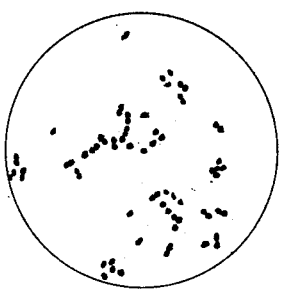

In the accompanying drawings:—Figure 1 shows an enlarged view of one kind of flavor-producing bacteria. Fig. 2 is an enlarged edge view of a colony of these bacteria. Fig. 3 is an enlarged top view thereof. Fig. 4 is an enlarged view of another kind of flavor-producing bacteria. Fig. 5 is a similar view of another kind of flavor-producing bacteria. Fig. 6 is an enlarged view of a colony of the bacteria shown in Fig. 5. Figs. 7 and 8 are enlarged views of harmful bacteria.

Among the flavor-producing acid bacteria which I have so far discovered and isolated and which are suitable for ripening milk and cream are the following:—

*Ferment A, (Bacterium acidi lactici aromagenes A.)*—This bacterium forms by distribution of the germs in gelatine small colonies of lenticular form, which have a smooth surface, and are opaque and of pure white color. The single bacterium is shaped like a rather elongated oval cell which by division multiplies into shorter oval cells, which previous to further subdivision grow somewhat in length. Cultivated in cream, milk or whey, they are most frequently separated from each other or at most united two together and form but rarely short chains of connected cells. Planted as puncture cultivation in neutral beef-peptone, gelatine and agar-agar gelatine, it forms no surface growth and develops along the cut often in colonies which may be separated or connected. In cream, milk or whey it multiplies very quickly, curdling the milk into a rather firm and perfectly uniform curd. It acidulates cream and milk quickly or imparts to them a very pure, agreeable, mildly acid taste, as well as a very pure and rather rich flavor. This bacterium is of very small size, at the highest 0.0012 millimeter long by 0.0004 millimeter thick. This bacterium is shown at a linear enlagement of about one thousand one hundred and eighty-six times in Fig. 1 of the accompanying drawings, which figure represents a micro-photograph of a small portion of a cover glass preparation of the pure culture of the bacterium in beef-peptone gelatine, stained with gentiana-violet. The colonies which are developed in beef-peptone gelatine have the form of a thick lens. Fig. 2 represents an edge view of such a colony and Fig. 3 a top view, both drawn at a linear enlargement of fifty-five times. The closer one colony lies to another in the gelatine, the smaller they are.

*Ferment B*, (*Strepto bacterium acidi lactici aromagenes.*)—This bacterium forms by distribution of the germs in gelatine small opaque colonies, usually of somewhat irregular shape, approximately lenticular and of rather smooth surface and of white color. Planted as puncture cultivation in neutral beef-peptone gelatine and agar-agar gelatine it forms no surface growth and gives a very sparse and slowly developing growth along the cut, with very weak fluorescence. In cream, milk and whey it always grows in chains of connected cells which latter are often in a more or less developed state of subdivision. The fully developed cell has a regular oval shape and is larger than bacterium A described above, namely, as a rule 0.001-0.0013 millimeter long by 0.0006 millimeter thick. In cream, milk or whey it multiplies rather slowly and best at a temperature above 20° centigrade. It ripens milk and cream and curdles them into a rather soft but uniform, even curd, imparting to them a very agreeable, extraordinarily mild acid taste and producing an exceedingly rich flavor. This bacterium is represented in Fig. 4 at a linear enlargement of about eleven hundred and eighty-six times.

*Ferment C*, (*Bacterium acidi lactici aromagenes C.*)—This bacterium forms by distribution in gelatine very small, white colonies of rather irregular, yet mostly globular construction, with not quite smooth surface, which in the polarized light shows strong refractive properties. The cultures develop sparsely and slowly in beef-peptone gelatine and agar-agar gelatine, and show as puncture cultivation no characteristic peculiarity. In cream and milk, however, it multiplies quickly, ripening and curdling the same and imparting to them a pure, rich acid taste, and an agreeable and rather rich flavor. The size of the cell does not differ much from that of bacterium A described above, but it is shorter and more chubby than said bacterium. Not unfrequently it forms short chains, yet it appears as often as single cells. This bacterium is represented in Fig. 5 at a linear enlargement of about eleven hundred and eighty-six times. The colonies of this bacterium have, while young, an almost smooth surface, but in a few days the surface becomes broken by projecting chains or tufts of bacteria and the colonies assume an appearance like that represented in Fig. 6.

I wish now to call attention to some bacteria which may become very troublesome in the manufacture of butter and which must be excluded from the pure flavor producing cultures.

*Acid bacterium D*. (*Bacterium lactici fluorescens Storch.*)—This bacterium is so closely in form and size like Bacterium acidi lactici aromagenes A, above described, that it cannot be distinguished from the same by these characteristics. The colonies developed by distribution of the germs in beef-peptone gelatine differ, however, very essentially. While, as above described, ferment A forms lens-shaped, white, opaque colonies, the acid bacterium D forms dish-shaped colonies, which, in passing light, are transparent like water or slightly opalescent but in reflected light are fluorescent with a bright blue color. This bacterium D multiplies rapidly in milk and acidulates and curdles the same into a firm coagulum like that produced by ferment A. It persistently accompanies other bacteria and it is difficult to purify ferment A from this bacterium. If it develops in milk with ferment A, the action of the latter is checked and no flavor is produced. Fig. 7 represents this ferment D at a linear enlargement of about eleven hundred and eighty-six times.

*Acid bacterium E.*—This bacterium imparts to butter a disgusting, tallowy taste when it has attained full development during the ripening of the cream from which the butter is churned. It is represented in Fig. 8 at a linear enlargement of about eleven hundred and eighty-six times. Gelatine cultures of this bacterium are easily recognized by the fact that its colonies quickly spread into extended, jelly-like and large opalescent spots on the surface of the gelatine. The purity of the cultures of bacterium A, B, and C is readily ascertained by testing their effect in ripening small batches of pasteurized or sterilized milk or cream. These flavor producing acid bacteria planted in a suitable substratum, for instance, beef-peptone-gelatine, form a ferment which when added to milk or cream produces a uniform acidulation and curdling of the same and develops a pure, rich flavor.

For the transportation and sale of these cultures, which may be either liquid or dry, hermetically sealed vessels are employed to prevent the introduction of foreign bacteria. A starter which is less pure but which may answer the purpose in a measure in many localities can be produced by the spontaneous souring of new milk or fresh skim milk from a creamery or dairy which produces butter of very fine flavor and in which, therefore, the desirable bacteria are known to predominate, such souring being effected upon setting the new milk or skim milk aside at a temperature of from 25° to 30° centigrade for about twenty-four hours. Sour cream or sour butter milk from a creamery or dairy producing very fine butter may also be used as a starter. The starter is added to the pasteurized cream or milk in the proportion of about five parts of starter, more or less, to about one hundred parts of cream or milk. The cream or milk to which the starter has been added is then left to ripen for about twenty-four hours at a temperature of from 20° to 25° centigrade. When fully ripened the cream or milk is cooled, preferably to a temperature of from 8° to 10° centigrade, or still lower, to give body to the butter and afterward the temperature is slightly raised to that most favorable for churning which is usually from 12° to 15° centigrade. The ripened cream or milk is then churned and treated in the usual way. The product is butter of very fine flavor due to the destruction of all noxious bacteria in the cream or milk and the introduction into the same of a pure or comparatively pure starter.

I do not wish to claim in this application a ferment composed of a practically pure culture of flavor producing acid bacteria, because that is claimed in my pending application for patent, Serial No. 361,504, filed August 9, 1890.

I claim as my invention—

The herein described method of making butter which consists in heating the cream or milk to a temperature at which the bacteria contained therein are destroyed, then cooling it to a temperature at which bacteria can be propagated, then adding a pure or comparatively pure starter, then allowing the cream or milk to ripen, and then churning, substantially as set forth.

Witness my hand this 28th day of July, 1892.

VILHELM STORCH.

Witnesses:
S. MIDDELBOE,
CHAS. KRAGENBÜHL.